United States Patent [19]

Koide

[11] Patent Number: 4,866,826

[45] Date of Patent: Sep. 19, 1989

[54] METHOD OF MAKING SQUEEZING ROLL AND SQUEEZING EQUIPMENT

[76] Inventor: Makoto Koide, 56, Osakabe 3-chome, Yao-shi, Osaka, Japan

[21] Appl. No.: 310,030

[22] Filed: Feb. 8, 1989

Related U.S. Application Data

[62] Division of Ser. No. 137,356, Dec. 22, 1987, abandoned.

[51] Int. Cl.[4] ........................ B21K 1/02; B21K 5/20; B23P 9/00

[52] U.S. Cl. ........................ 29/148.4 D; 29/163.6; 29/445; 29/125; 100/121; 156/644

[58] Field of Search ............... 29/148.4 D, 445, 163.6, 29/125, 121; 156/644

[56] References Cited

U.S. PATENT DOCUMENTS

| | | | |
|---|---|---|---|
| 3,217,387 | 11/1965 | Strindlund | 100/121 X |
| 3,700,418 | 10/1972 | Mayeda | 156/644 X |
| 3,825,456 | 7/1974 | Weber et al. | 156/644 X |
| 3,975,814 | 8/1976 | Harrowing | 29/445 X |
| 4,149,304 | 4/1979 | Brynjegard | 29/445 X |
| 4,207,668 | 6/1980 | Previte | 29/445 X |
| 4,561,156 | 12/1985 | Sun | 100/121 X |
| 4,566,165 | 1/1986 | Georget | 29/148.4 D X |
| 4,686,752 | 8/1987 | Sharples | 29/163.6 |

FOREIGN PATENT DOCUMENTS

| | | | |
|---|---|---|---|
| 280032 | 3/1970 | Austria | 162/358 |
| 55-1316 | 1/1980 | Japan . | |
| 55-30445 | 3/1980 | Japan . | |

*Primary Examiner*—Charlie T. Moon

*Attorney, Agent, or Firm*—Stevens, Davis, Miller & Mosher

[57] ABSTRACT

The compression roll comprises a plurality of thin circular plates stacked in axial direction of the compression roll, these plates having a plurality of holes which is provided at a fixed spacing around the center of the plates and becomes continuous through holes which pass through stacked plates, and a plurality of grooves which is formed from the outer circumference to the holes and becomes microholes which extend from the circumferential surface to the through holes. The through holes are connected to the pressure guide on the side of the roll.

8 Claims, 3 Drawing Sheets

METHOD OF MAKING SQUEEZING ROLL AND SQUEEZING EQUIPMENT

This application is a division of application Ser. No. 137,356, filed Dec. 22, 1987, now abandoned.

BACKGROUND OF THE INVENTION

This invention relates to a squeezing roll and a squeezing equipment which uses this roll and a method of manufacturing the roll and equipment. Both the roll and the equipment are used to compress substances which contain liquid such as fibrous substance containing liquid, sponge, or slurry-like substance (hereafter called the liquid containing substance) and to squeeze the liquid from such substances.

There has been conventionally and extensively used a squeezing equipment which squeeze liquid from a liquid containing substance to reduce the liquid content of the liquid containing substance. In such squeezing equipment as above, with respect to a pair of squeezing rolls in general, (1) the lower roll is a steel roll such as a stainless roll and the upper roll is a rubber roll, (2) both the upper and lower rolls are rubber rolls, and (3) both the upper and lower rolls are steel rolls, and the liquid used to be squeezed by holding liquid containing substance between these rolls.

However, in a normal squeezing equipment stated in (1) through (3) above, even if the liquid containing substance is compressed, it is not possible to completely remove the liquid that is present in spaces in a compressed liquid containing substance and the liquid content after squeezing becomes high by the amount of such liquid.

There is known a squeezing equipment proposed to date for the purpose of improving the above problem, for example, which is disclosed in Japanese unexamined Patent Publication (KOKAI) Nos. 1316/1980, and 30445/1980 wherein a plurality of relatively thick circular plates are stacked integrally by means of spacers used to provide spaces between such circular plates and squeezing rolls having water suction pipe which is provided at the roll center and connected through the foregoing spaces.

However, because this squeezing equipment sucks in the air from all over its circumference, even if sections other than the squeezing section are sheathed by a cover or the like to restrict the section of the air, there exists a problem that the liquid absorption efficiency is poor and that wool of fiber of textile goods for example are likely to clog between the spaces.

There has been another method proposed wherein, with respect to a pair of rolls, one roll stacked in axial direction with a number of circular nonwoven fabric sheet 9 is used as shown in FIG. 7 and the other roll which is made of steel or rubber and the like is used so that it is possible to cause the liquid to be absorbed by the nonwoven fabric. However, with this method, the liquid is not absorbed under a maximum squeezing but is absorbed into the nonwoven fabric during a process wherein the squeezing is alleviated, therefore, the effect of absorption and removal of the liquid is small. There also exists a defect that, if the liquid contains very small solids or highly viscose substances, such substances can clog inside the nonwoven fabric, causing the liquid absorbing power to lower gradually.

SUMMARY OF THE INVENTION

It is a primary object of this invention to provide a squeezing roll and method of manufacture thereof, which is capable of improving the foregoing defects of the prior art so as to squeeze the liquid efficiently from the liquid containing substance.

Another object of this invention is to provide a squeezing equipment and method of manufacture thereof, which efficiently discharges the liquid squeezed by the squeezing rolls to achieve high squeezing effect.

Further object and advantages of this invention will be clarified by the following descriptions.

The squeezing roll of this invention comprising a plurality of thin circular plates stacked in axial direction, these thin circular plates have a plurality of holes which is provided at a fixed spacing around the center thereof and becomes continuous through holes which matually pass through the stacked thin circular plates, and a plurality of grooves which is formed on one surface or both surfaces from the outer circumference edge of the foregoing thin circular plates to the foregoing holes and becomes microholes which extend from the outer circumference edge to the horegoing continuous through holes of the stacked thin circular plates.

The squeezing roll constituted in above manner is used for at least one roll of a pair of squeezing rolls, which compresses the liquid containing substance. In this arrangement, a pressure conductive element is provided on the side of the squeezing roll, the front opening thereof is caused to contact freely slidably to the side of the squeezing roll at a position where the foregoing through hole pass before the front opening as the roll rotates.

For the other roll which is made a pair of this roll, a roll of steel and rubber or the like which has been used conventionally can be used.

The stacked thin circular plates can be made from metallic or plastic material, and manufactured by processing a plurality of grooves with chemical etching.

In another method, the stacked thin circular plates can be made from plastic material and all of the outer circumference, holes, and grooves thereof can also be manufactured by plastic processing method such as injection molding method or squeezing molding method.

DETAILED DESCRIPTION OF THE INVENTION

Referring now in detail to the drawings, the squeezing roll of this invention and the squeezing equipment which uses this squeezing roll will be described.

Figure 1:
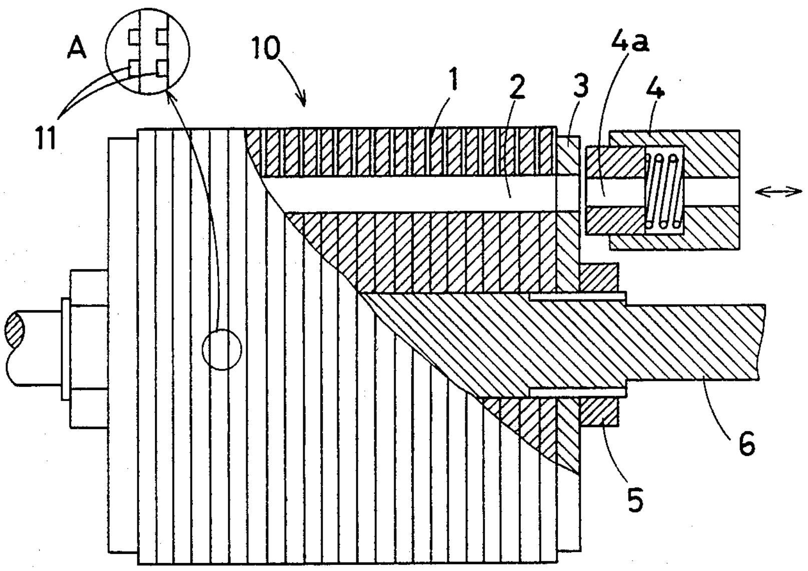
FIG. 1 is a partially cutaway front view of the squeezing roll formed according to this invention.
Figure 2:
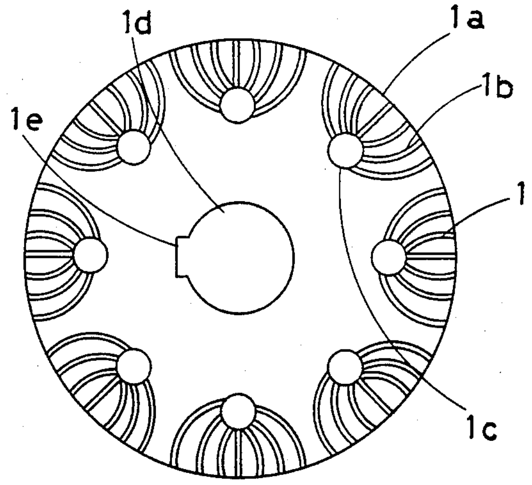
FIG. 2 is a plan view of the thin circular plate described in FIG. 1.

For at least one roll of a pair of squeezing rolls, a roll 10 which has a plurality of thin circular plates 1 stacked in axial direction as shown in FIG. 1 is used. As shown in FIG. 2, each thin circular plate 1 is provided in part thereof with a plurality of holes 1*c*, and a plurality of grooves 1*b* is provided extending from the outer circumference edge 1*a* of the thin circular plate 1 to the plurality of foregoing holes 1*c*. The thickness of the thin circular plate 1 is normally ranges from 0.2 to 10 mm and 0.5 to 3 mm is more desirable. The pitch of the groove 1*b*, at the outer edge 1*a*, is normally about 0.2 to 5 times the thickness of the thin circular plate 1, and 0.5 to 2 times the thickness thereof is desirable. The width of the groove 1*b* is normally about 0.1 to 1.5 times the thickness of the thin circular plate 1, and 0.2 to 0.5 times the thickness thereof is desirable. The depth of the groove 1*b* is normally about 0.05 to 0.8 times the thickness of the thin circular plate 1, and 0.1 to 0.5 times the thickness thereof is desirable.

When these thin circular plates 1 are stacked and tightened by the side circular plate 3, there will be constituted a through hole 2 which pass through the stacked thin circular plates 1 and the side circular plate 3, and the groove 1*b* becomes as shown in an expanded diagram A on the roll surface, which is made a number of microhole 11 which is connected to the through hole 2. In the side circular plate 3 of the roll side, a pressure conductive element 4 is provided so that the frontal opening 4*a* gradually slides to contact a part of a plurality of these through holes 2, as the roll rotates.

Figure 3:
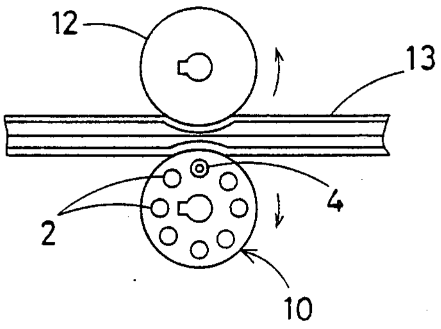
FIG. 3 is a side view formed according to the squeezing equipment of this invention.

FIG. 3 shows the squeezing equipment wherein the squeezing roll 10 shown in FIG. 1 and the ordinary roll 12 are opposed and a liquid suction device (not shown in the diagram) such as vacuum pump is connected to the pressure conductive element 4 provided on the side of the squeezing roll 10. When this squeezing equipment is operated, the liquid containing substance 13 is squeezed of the liquid equivalent to the reduced volume of the liquid containing substance 13, during the squeezing process thereof the liquid is absorbed and removed efficiently through the microholes 11 on the surface of the stacked thin circular plate 1 made up by the grooves 1*b* of FIG. 2, whereby it becomes possible to reduce the liquid content of the liquid containing substance 13 after it has passed the squeezing equipment.

When the pressure conductive element 4 is connected to an air compressing device (not shown in the diagram) and the squeezing equipment is operated, the liquid containing substance 13 is compressed by the roll surfaces and the compressed air gushing out through the microhole 11 enters into inside the liquid containing substances 13 to discharge the liquid outside the roll, whereby it is possible to reduce the liquid content of the liquid containing substance 13.

Further, when two of the squeezing rolls 10 shown in FIG. 1 are used and a compressed air source or a vacuum source is connected to the pressure conductive element 4 of respective rolls in the following combination, it is possible to reduce further the liquid content.

Compressed air source : Released in atmosphere
Compressed air source : Vacuum source
Released in atmosphere: Vacuum source Furthermore, to prevent clogging of the roll surface on the vacuum suction side or the released-in-atmosphere exhaust side, a separate pressure conductive element can be provided at a position other than the squeezing position of the roll, and it is also possible to cause wool and fabric clogged in the microhole 11 to jet out by connecting a compressed air source to the separate pressure conductive element.

Figure 4:
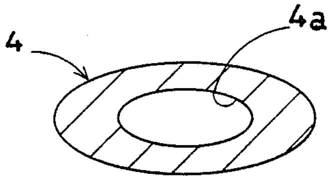
FIG. 4 is a cross-sectional view showing an example of the pressure conductive element.

In FIG. 3, the opening of the pressure conductive element 4 is made a circular shape, but as shown in FIG. 4, the opening 4*a* may be constituted as a slot which is equal at least to the distance between the hole 1*c* and 1*c*, whereby it becomes possible to suck in or push out the liquid continuously. Also, not only one but also more than one of the pressure conductive element 4 may be provided in the neighbourhood of the pressure conductive element 4.

Figure 5:
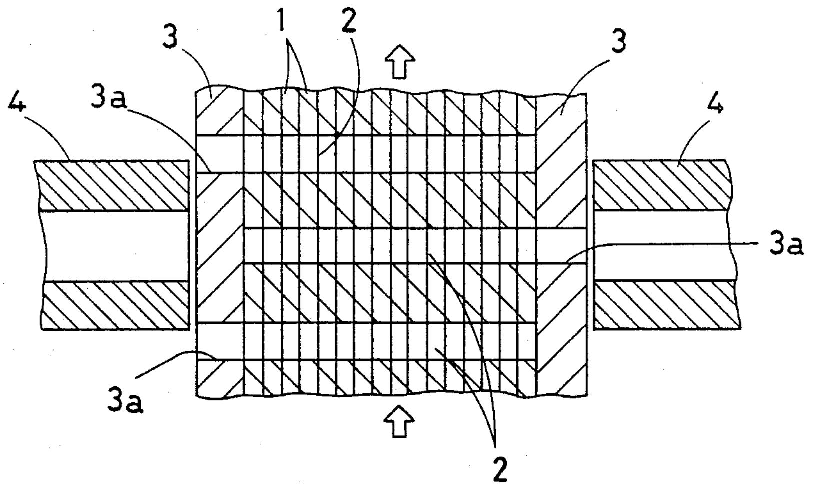
FIG. 5 is a partially sectional view showing the relation between the pressure conductive element and the squeezing roll.
Figure 6:
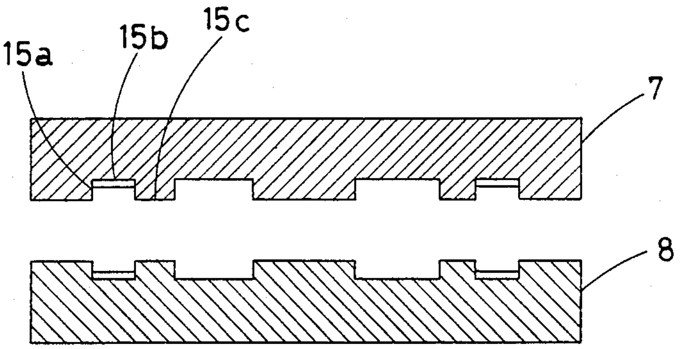
FIG. 6 is a cross-sectional view of the mold to manufacture plastic thin circular plate.
Figure 7:
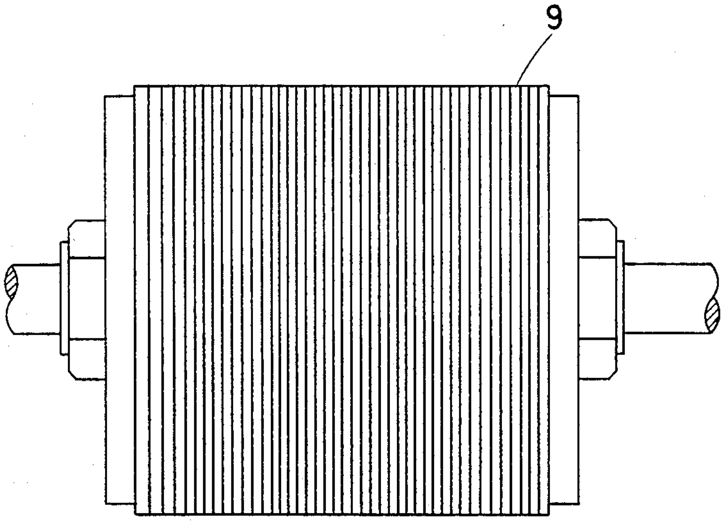
FIG. 7 is a front view of the conventional nonwoven fabric roll.

Furthermore, as shown in FIG. 5, the pressure conductive elements 4 and 4 may be provided on both sides of the roll 1. In this case, the hole 3*a* of the side circular plate 3 which is connected to the hole 2 is provided alternately at right and left side so that the hole 2 is connected through sequentially to the pressure conductive elements 4 and 4 on both sides. In this case also, it is possible to continuously suck in or push out the liquid.

EMBODIMENT 1

An embodiment for manufacturing the thin circular plate 1 shown in FIG. 2 by chemical etching method will hereafter be described.

As a material of the thin circular plate, a stainless steel sheet (SUS-304 or SUS-316) of 0.5 to 1.6 mm thick is stamped to have outer diameter which is greater than the necessary overall dimension by 0.5 to 1.0 mm. Then, the hole 1*c*, the hole 1*d* for fitting a center shaft, and the key way 1*e* are stamped. After photosensitive resin liquid is coated all over this circular plate 1 and dried in a dark room, a photographic film having a pattern wherein the groove 1*b* is shaded and other parts is made transparent is placed on one side or on both sides of the foregoing stainless steel sheet and the light is irradiated thereupon from above. As a photosensitive resin liquid, the one generally used for etching of printed circuit boards is used. By making arrangements as above, the photosensitive resin liquid coated on parts other than those which become the groove is irradiated and changed into a substance which is not soluble by a specific organic solvent. However, the photosensitive resin liquid coated on the part which becomes the groove is not irradiated with light, therefore, the photochemical reaction of the photosensitive resin is not accelerated and is dissolved and removed by a specific organic solvent. When a stainless steel sheet given a pretreatment in a manner such as above is immersed into a chemical etching solution such as ferric chloride, hydrochloric acid, and sulfuric acid, the part whose photosensitive resin is dissolved comes in direct contact with the chemical etching solution to be dissolved and the groove 1*b* is formed.

This groove 1*b* is disposed so that foreign objects do not clog in the middle of the groove 1*b* by forming the groove 1*b* to become gradually large in size from the outer edge 1*a* to the hole 1*c* by means of the foregoing shaded film pattern.

The thin circular plate 1 processed in above manner is stacked and fixed to the shaft 6 by being pressed thereto by means of the side circular plate 3 and the clamping tool 5, and the outer diameter is cut, ground, and finished to a predetermined dimension. As a result, it is possible to manufacture a roll having smooth surface and very large number of microholes.

EMBODIMENT 2

An embodiment to manufacture the thin circular plate 1 shown in FIG. 2 by plastic injection molding method or squeezing forming method will be described hereafter. In the same manner as the foregoing embodiment 1, the thin circular plate 1 is stamped to be larger by 0.5 to 1.0 mm than the necessary diameter of the roll and formed to have reversed concave and convex shapes of the thin circular plate 1 shown in FIG. 2, and is machined into a shape which can be split in half as plastic forming molds 7 and 8. The reversed section 15*b* of the groove 1*b* is processed by a metal engraving machine, but as stated in the embodiment 1, the width and depth of the groove are increased successively from the reversed section 15*a* of the outer edge 1*a* to the reversed section 15*c of the hole 1c*. The pitch, width, and depth of the groove are made almost the same as those of the foregoing embodiment 1. After the plastic forming molds such as above are manufactured beforehand, necessary number of plastic thin circular plate 1 is obtained by using such plastic forming molds and by accomplishing the injection molding or squeezing molding of the plastic. After this point, the roll is manufactured in the same manner as that of the embodiment 1.

In place of the foregoing metal engraving, the thin circular plate of stainless steel sheet or copper sheet manufactured in the embodiment 1 is made a mother die, whose surface is electroplated and peeled off, and further backed by metal of low melting point to make a plastic forming metallic die.

As materials of plastics, it is possible to adequately select, depending on mechanical properties, chemical properties, and temperature of the compressed liquid containing substances, from all plastic materials including thermosetting resins such as polyethylene, polypropylene, polybutylene, polyamide, polyester, polycarbonate, polyacetal, polyphenylenoxide, polyurethane, and polyvinyl chloride or epoxy resin, phenol resin, melamine resin and polyimide.

As described above, the squeezing roll of this invention has very large number of microholes over the roll surface and it is possible to efficiently discharge the liquid of the liquid containing substance through microholes by providing liquid suction or air pressurization or both during the liquid containing substance being compressed by the roll, therefore, it is possible to reduce considerably the remaining liquid in the liquid containing substance after the processings of this invention have been accomplished.

In a manufacturing method of the thin circular plate 1, a number of very small grooves can be uniformly manufactured by employing chemical etching method or plastic injection molding method or squeezing molding method, and clogging in microholes of the roll can be made difficult to occur by successively increasing the width and depth of the groove from the outer edge thereof to the hole of the pressing side. Furthermore, to prevent clogging on the roll surface on the liquid suction side or the released-in-atmosphere discharge side, it is also possible to remove clogging, if it occurs, by providing a separate pressure conductive element at a position other than the pressure conductive element at the roll squeezing position and by connecting the separate pressure conductive element to an air compressing device.

What is claimed is:

1. A method of manufacturing a squeezing roll, said method comprising:

(a) forming a plurality of through holes at a fixed spacing around the center of a plurality of thin circular plates;

(b) stacking said plurality of thin circular plates together such that said through holes are aligned to provide continuous through holes which mutually pass through the stacked thin circular plates; and (c) forming a plurality of grooves by chemical etching on one surface or both surfaces extending from the outer circumferential edge of said thin circular plates to said continuous through holes to provide microholes which extend from the outer circumferential edge to said continuous through holes of the stacked thin circular plates.

2. A method according to claim 1, wherein said grooves are formed such that their width and depth increase successively from the outer circumferential edge of said thin circular plate to said continuous through holes.

3. A method of manufacturing squeezing equipment, said method comprising:

forming a squeezing roll by (a) forming a plurality of through holes at a fixed spacing around the center of a plurality of thin circular plates; (b) stacking said plurality of thin circular plates together such that said through holes are aligned to provide continuous through holes which mutually pass through the stacked thin circular plates; and (c) forming a plurality of grooves by chemical etching on one surface or both surfaces extending from the outer circumferential edge of said thin circular plates to said continuous through holes to provide microholes which extend from the outer circumferential edge to said continuous through holes of the stacked thin circular plates;

providing a second roll having its circumferential surface opposed to a circumferential surface of said squeezing roll such that an object to be compressed may be passed between said squeezing roll and said second roll, and providing a pressure conductive element on a side of said squeezing roll such that a frontal opening of said pressure conductive element is opposed on the locus of said continuous through holes on the side of said squeezing roll so that said continuous through holes pass adjacent to said frontal opening as said squeezing roll and said second roll rotate.

4. A method according to claim 3, further comprising connecting said pressure conductive element to a liquid suction device and orienting said pressure conducting element at an angle on a side of said squeezing roll at which a squeezing force is greatest.

5. A method according to claim 3, further comprising connecting said pressure conductive element to an air compressing device and orienting said pressure conductive element at an angle on a side of said squeezing roll at which a squeezing force is greatest.

6. A method according to claim 3, further comprising providing said pressure conductive element with a pressure conductive element for sucking liquid and a pressure conductive element for blowing air to remove clogging and orienting said pressure conductive element for sucking liquid at an angle on a side of said squeezing roll at which a squeezing force is greatest and positioning said pressure guide for blowing air at another position.

7. A method of manufacturing squeezing equipment, comprising:

providing a pair of squeezing rolls having opposed circumferential surfaces such that an object can pass therebetween to be compressed;

forming each of said squeezing rolls by (a) forming a plurality of through holes at a fixed spacing around the center of a plurality of thin circular plates; (b) stacking said plurality of thin circular plates together such that said through holes are aligned to provide continuous through holes which mutually pass through the stacked thin circular plates; and (c) forming a plurality of grooves by chemical etching on one surface or both surfaces extending from the outer circumferential edge of said thin circular plates to said continuous through holes to provide microholes which extend from the outer circumferential edge to said continuous through holes of the stacked thin circular plates; and providing a pressure conductive element on each side of said pair of squeezing rolls such that a frontal opening of said a pressure conductive element is opposed on the locus of said continuous through holes on the side of said squeezing rolls so that said continuous through holes pass adjacent to said front opening as said squeezing rolls rotate.

8. A method according to claim 7, further comprising connecting said pressure conductive element to a liquid suction device and orienting said pressure conductive element at an angle on a side of said squeezing roll at which a squeezing force is greatest.

* * * * *